United States Patent
Liu et al.

(10) Patent No.: US 9,310,945 B2
(45) Date of Patent: Apr. 12, 2016

(54) TOUCH-SENSING DISPLAY DEVICE

(71) Applicant: HIMAX TECHNOLOGIES LIMITED, Tainan (TW)

(72) Inventors: Jui-Ming Liu, Tainan (TW); Li-Lin Liu, Tainan (TW); Chung-Wen Chang, Tainan (TW); Shen-Feng Tai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 204 days.

(21) Appl. No.: 14/054,332

(22) Filed: Oct. 15, 2013

(65) Prior Publication Data

US 2015/0103031 A1    Apr. 16, 2015

(51) Int. Cl.
*G06F 3/041* (2006.01)
*G06F 3/044* (2006.01)

(52) U.S. Cl.
CPC .............. *G06F 3/044* (2013.01); *G06F 3/0418* (2013.01)

(58) Field of Classification Search
USPC .......................................... 345/156, 173, 174
See application file for complete search history.

(56) References Cited

U.S. PATENT DOCUMENTS

| 4,733,222 | A  | * | 3/1988  | Evans       | 341/33  |
| 2013/0265271 | A1 | * | 10/2013 | Hsu et al.  | 345/174 |
| 2013/0271161 | A1 | * | 10/2013 | Solven et al. | 324/661 |

* cited by examiner

*Primary Examiner* — Calvin C Ma
(74) *Attorney, Agent, or Firm* — McClure, Qualey & Rodack, LLP

(57) ABSTRACT

A touch-sensing display device comprises a plurality of row electrodes and column electrodes, a capacitance detector, detecting first capacitance-variation values of the row electrodes and second capacitance-variation values of the column electrodes, and detecting third capacitance-variation values of each intersection of the row electrodes and the column electrodes. The processor counts the first number of the first and second capacitance-variation values, exceeding a first threshold, counts the second number of the first and second capacitance-variation values up to a maximum capacitor-variation value, and counts the third number of the third capacitance values, exceeding a second threshold. The processor makes the touch-sensing display device enter a bending mode when the first and second numbers are over a first predetermined number and a second predetermined number respectively, and the third number is below the first number. The processor further raises the second threshold when entering the bending mode.

9 Claims, 6 Drawing Sheets

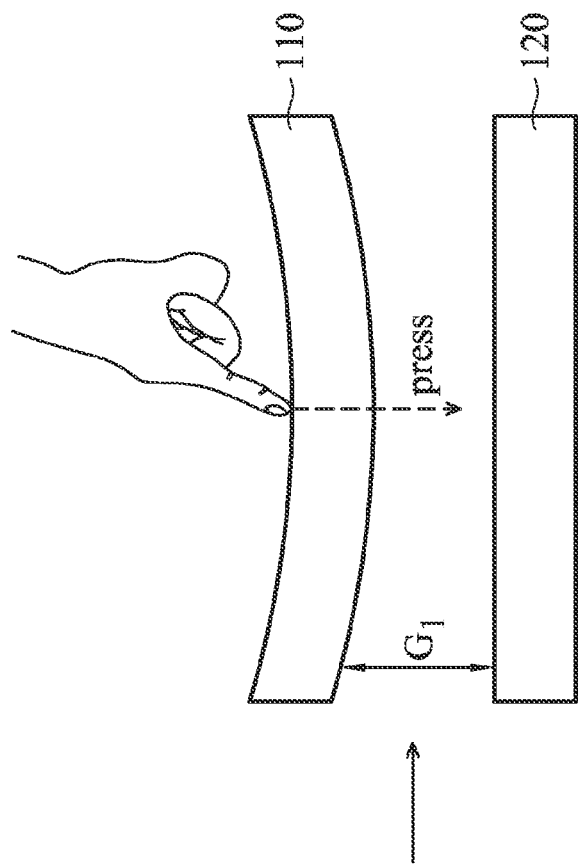
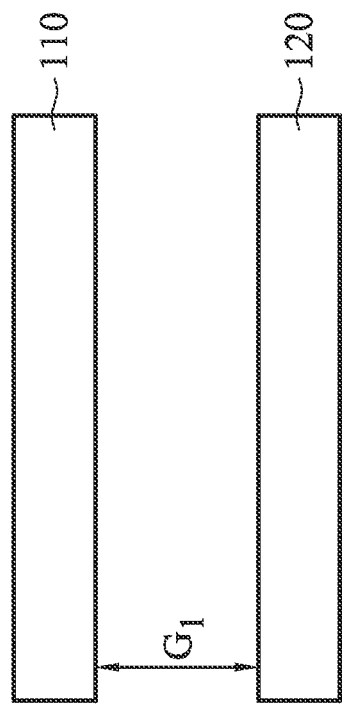
FIG. 1A
FIG. 1B

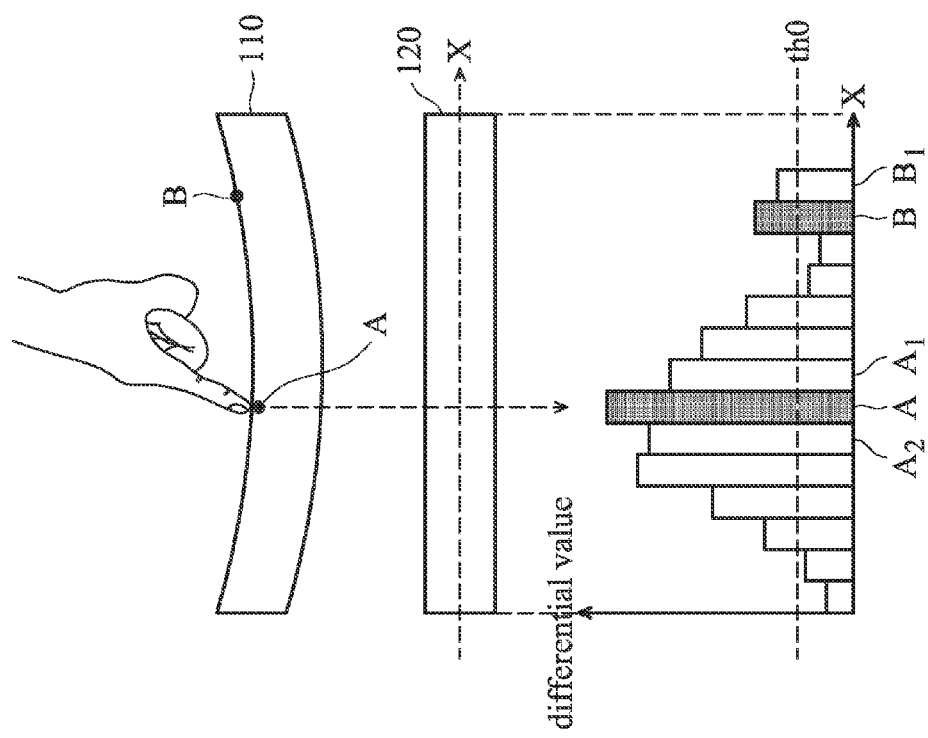

TOUCH-SENSING DISPLAY DEVICE

BACKGROUND OF THE INVENTION

1. Field of the Invention

The present invention relates to the touch-sensing display device and in particular to the touch-sensing display device for reducing the misreporting of the touch point.

2. Description of the Related Art

Given the ubiquity of portable devices such as PDAs and cell phones, touch-sensing display devices have attracted much attention. Generally, a touch-sensing display device is composed of a touch panel and a liquid-crystal module. There are some ways to integrate the touch panel with the liquid-crystal module, such as "out-cell", "on-cell", and "in-cell," as it is known in the art. In short, the techniques can be divided into two types, bonding techniques (also called Lamination) and un-bonding techniques.

FIG. 1A is a schematic diagram illustrating a touch-sensing display device made by a bonding technique. With respect to the bonding technique, because the touch panel 110 and the liquid-crystal module 120 are combined together by the bonding technique, there may exist a gap $G_1$ (as shown in FIG. 1A), such as air, between the touch panel 110 and the liquid-crystal module 120 resulting in poor touch efficiency, such as the touch-sensing display device misreporting a touch point (as described below).

When the user touches the touch-sensing display device, the capacitance value of the capacitor disposed in the touch panel 110 will change. The microprocessor (not shown) compares the variation of the capacitance values (hereinafter is referred to as the differential values) with a threshold so as to detect what point is pressed. In short, the above description is called reporting the touch point, represented by the word "reporting".

FIG. 1B is a diagram illustrating the touch panel 110 being pressed resulting in a Bending Phenomenon. As show in FIG. 1B, due to the gap $G_1$ between the touch panel 110 and the liquid-crystal module 120, the touch panel 110 bends seriously when the touch panel 110 is pressed heavily. That is to say that the Bending Phenomenon occurs on the touch panel 110. The Bending Phenomenon leads to misreporting of the touch point of the touch-sensing display device, further affecting touch efficiency. It should be noted that when the strength of the press on the touch panel 110 is stronger, the misreporting of the touch point becomes more pronounced.

FIG. 2A is a diagram illustrating the Bending Phenomenon resulting from a heavy press. FIG. 2B is a diagram illustrating the differential values' behavior when touching the touch panel 110 with strong force. Referring to FIGS. 2A and 2B, because a finger or another object presses point A on the touch panel 110 heavily, the whole touch panel 110 bends seriously, further resulting in the differential value of the un-pressed points nearby point A, such as points A1 and A2, varying drastically and resulting in the differential value of the un-pressed point not nearby point A, such as points B and B1 varying drastically as well, as shown in FIG. 2B.

The microprocessor (not shown) compares all the differential values with the threshold th0 so as to detect what point is pressed according to the comparing results. For example, the differential value of point A is the highest one and is over the threshold. Points A1 and A2 nearby point A are also over the threshold. The microprocessor determines that point A is pressed according to the differential values of points A1 and A2, wherein the judging method for determining what point is pressed is designed by the designer and installed in the microprocessor, as is known in the art.

With respect to points B and B1 not being nearby the pressed point A, the differential value of points B and B1 that are not pressed is also higher than the threshold th0, as shown in FIG. 2B. Thus, the microprocessor (not shown) regards point B as the pressed point according to comparing results and the same judging method. However, point B is not actually pressed, and thus point B is called a "Ghost Point," as it is known in the art. This foregoing situation is called misreporting the touch point, represented by the word "misreporting".

Thus, there is a need to provide a new touch-sensing display device to prevent misreporting of the touch point so as to further enhance touch efficiency.

BRIEF SUMMARY OF THE INVENTION

A detailed description is given in the following embodiments with reference to the accompanying drawings.

Aspects of the present invention are to address at least the above-mentioned problems and/or disadvantages and to provide at least the advantages described below. Accordingly, an aspect of the present invention is to provide a touch-sensing display device for preventing the misreporting of the touch point that occurs when a gap exits between the Touch panel and the Liquid-crystal Module, and when the Touch panel is pressed heavily.

In accordance with an aspect of the present invention, a touch-sensing display device is provided. The touch-sensing display device includes a plurality of row electrodes and column electrodes, a capacitance detector detecting first capacitance-variation values of each of the row electrodes with respect to a reference and second capacitance-variation values of each of the column electrodes with respect to the reference, and detecting third capacitance-variation values of each intersection of the row electrodes and the column electrodes, and a processor carrying out a first operation to determine the entering of a bending mode, according to the first, second and third capacitance-variation values. In the first operation, the processor counting the first number of the first and second capacitance-variation values which exceed a first threshold, counting the second number of the first and second capacitance-variation values which are up to a maximum capacitor-variation value, and counting the third number of the third capacitance values which exceed a second threshold. The processor makes the touch-sensing display device enter the bending mode when the first and second numbers are over a first predetermined number and a second predetermined number respectively, and the third number is below the first number. The processor carries out a second operation to raise the second threshold when the touch-sensing display device is in the bending mode.

The present invention further presents a method according to which the above touch-sensing display device operates for reducing the misreporting of the touch point of the touch-sensing display device. The method comprises: providing a plurality of row electrodes and column electrodes, detecting first capacitance-variation values of each of the row electrodes with respect to a reference and second capacitance-variation values of each of the column electrodes with respect to the reference, and detecting third capacitance-variation values of each intersection of the row electrodes and the column electrodes. It further comprises counting the first number of the first and second capacitance-variation values which exceed a first threshold, counting the second number of the first and second capacitance-variation values which are up to a maximum capacitor-variation value, and counting the third number of the third capacitance values which exceed a second threshold. The first operation comprises carrying out a first operation to determine the entering of a bending mode, according to the first, second and third capacitance-variation values, making the touch-sensing display device enter the bending mode when the first and second numbers are over a first predetermined number and a second predetermined number respectively, and when the third number is below the first number, carrying out a second operation to raise the second threshold when the touch-sensing display device is in the bending mode.

BRIEF DESCRIPTION OF THE DRAWINGS

The present invention can be more fully understood by reading the subsequent detailed description and examples with references made to the accompanying drawings, wherein:

FIG. 1A is a schematic diagram illustrating the touch-sensing display device made by bonding technique;

FIG. 1B is a diagram illustrating the touch panel being pressed resulting in a Bending Phenomenon;

FIG. 2A is a diagram illustrating the Bending Phenomenon resulting from the heavy press;

FIG. 2B is a diagram illustrating the differential values' behavior when touching the touch panel 110 with a strong force;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
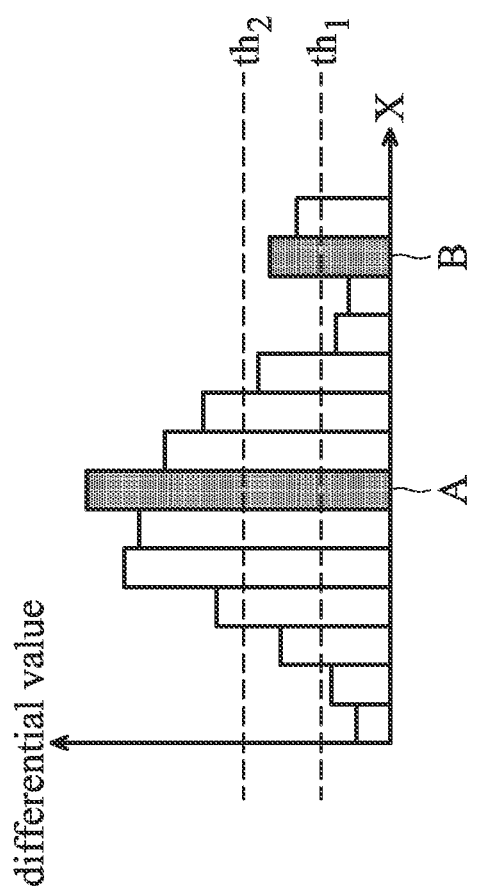
FIG. 3 is a diagram illustrating the differential values' behavior.

FIG. 3 is a diagram illustrating the differential values' behavior according to an exemplary embodiment of the present invention. The present invention presents a touch-sensing display device for reducing the misreporting of the touch point by raising the threshold, as shown in FIG. 3. Compared with FIG. 2B, the touch-sensing display device of the present invention makes the threshold value rise from the threshold value th1 to the threshold value th2, wherein the threshold value th2 is over the differential value of point B. Thus, point B would not be regarded as the pressed point by the microprocessor so as to mitigate the misreporting of the touch point issue. The variations of those capacitance values known as the differential values have a variation range of 0-255; however, another range is also considered. That it to say, 255 is a maximum capacitor-variation value in the present invention. It is noted that the above descriptions are only for exemplifying the invention and it is not limited thereto.

Figure 4:
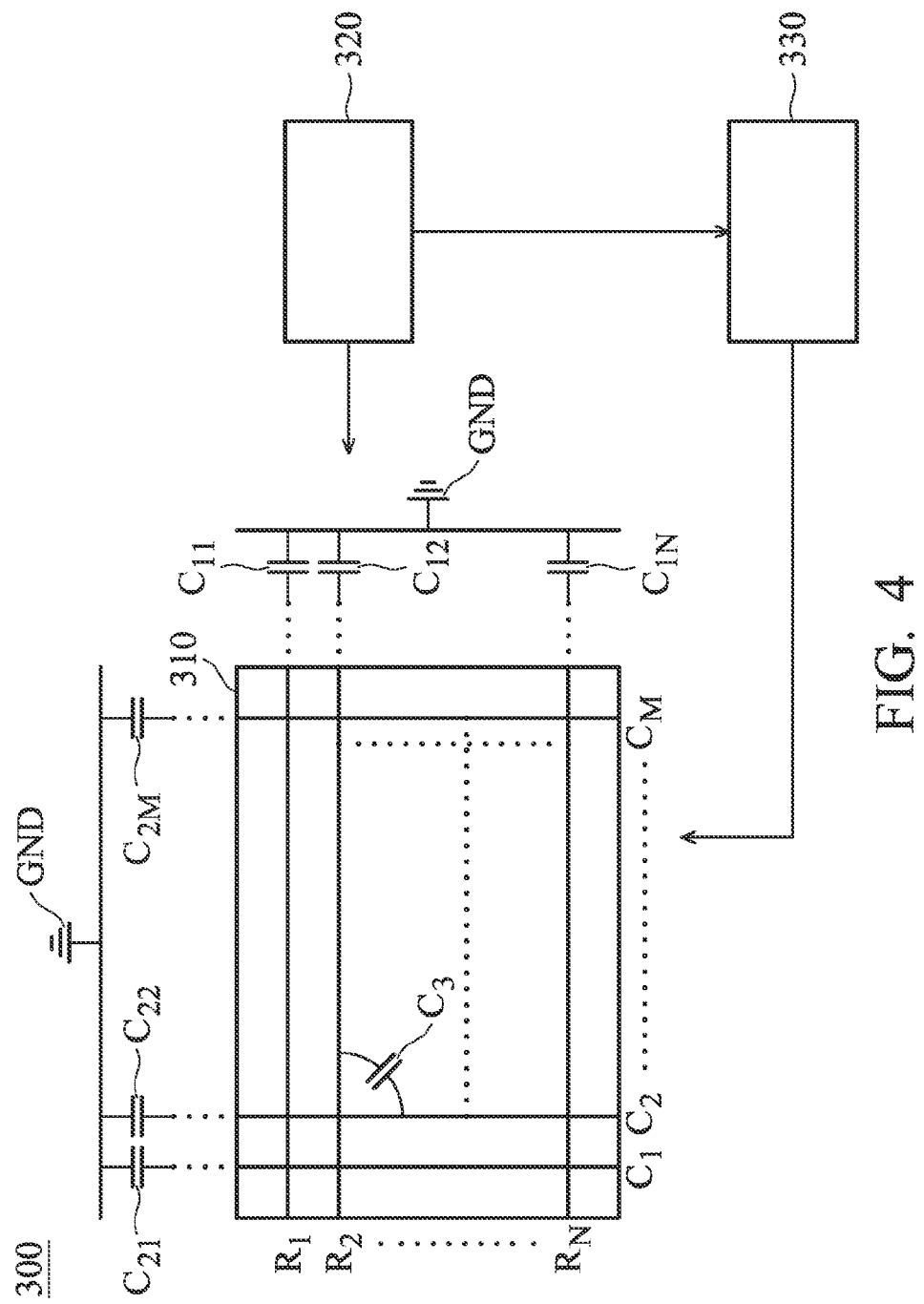
FIG. 4 is a block diagram illustrating the touch-sensing display device 300 according to an exemplary embodiment of the present invention.

FIG. 4 is a block diagram illustrating the touch-sensing display device 300 according to an exemplary embodiment of the present invention. The touch-sensing display device 300 includes a plurality of row electrodes (for example, row electrode $R_1, R_2, \ldots, R_N$ as shown in FIG. 4) and column electrodes (for example, column electrode $C_1, C_2, \ldots, C_M$ as shown in FIG. 4) arranged on a touch panel 310, a capacitance detector 320 and a processor 330. The capacitance detector 320 is coupled to the touch panel 310, further being coupled to the plurality of row electrodes and column electrodes. The processor 330 is coupled to the touch panel 310 and the capacitance detector 320. It is noted that the touch-sensing display device 300 further includes a liquid-crystal module (not shown), but the Bending Phenomenon occurs on the touch panel 310. Thus, the following descriptions focus on the touch panel 310.

Each of the row electrodes could form the equivalent capacitance (designated with the capacitance $C_{11}, C_{12}, \ldots, C_{1N}$ in FIG. 4) and each of the column electrodes could form the equivalent capacitance (designated with the capacitance $C_{21}, C_{22}, \ldots, C_{2M}$ in FIG. 4) as well. Those capacitances $C_{11}, C_{12}, \ldots, C_{1N}$ and $C_{21}, C_{22}, \ldots, C_{2M}$ are called "Self Capacitance", as it is known in the art. Additionally, each intersection of the row electrodes and the column electrodes form the equivalent capacitance (designated with the capacitance $C_3$ in FIG. 4), called "Mutual Capacitance," as it is known in the art.

The capacitance detector 320 detects the variation of the capacitance value of the foregoing capacitances, Self Capacitance and Mutual Capacitance, wherein the variation of the capacitance value of the foregoing capacitances are also called "differential value" herein. The capacitance detector detects first capacitance-variation values of each of the row electrodes with respect to a reference (such as the reference ground GND as shown in FIG. 4) and second capacitance-variation values of each of the column electrodes with respect to the reference (such as the reference ground GND as shown in FIG. 4). In addition, the capacitance detector 320 detects third capacitance-variation values of each intersection of row electrodes and column electrodes. The capacitance detector 320 detects the variation of the capacitance values of the "Self Capacitance" and the "Mutual Capacitance".

In another exemplary embodiment of the present invention, the capacitance detector 320 further comprises a self-sensing channel (not shown) and a mutual sensing channel (not shown). The self-sensing channel detects the first capacitance-variation values and the second capacitance-variation values; that is to say the capacitance detector 320 detects the variation of the capacitance value of Self Capacitance, and transmits the detection results to the processor 330. In addition, the mutual sensing channel detects the third capacitance-variation values; that is to say the mutual sensing channel detects the variation of the capacitance value of Mutual Capacitance, and transmits the detection results to the processor 330.

The conventional touch-sensing display device would misreport the touch point when the Bending Phenomenon occurs. In view of this, the touch-sensing display device 300 of the present invention is able to detect the Bending Phenomenon occurring on the touch-sensing display device 300 so as to enter a "bending mode" for preventing any misreporting of the touch point. The details are described below.

The processor 330 carries out a first operation to determine the entering of a bending mode, according to the first, second and third capacitance-variation values and carries out a second operation sequentially.

In the first operation, the processor 330 compares the first and second capacitance-variation values with a first threshold, called the "self threshold" and counts the first number N1 of the first and second capacitance-variation values which exceed the first threshold. The processor 330 further counts the second number N2 of the first and second capacitance-variation values which are up to a maximum capacitor-variation value, for example, the maximum capacitor-variation value is 255. In addition, the processor 330 counts the third number N3 of the third capacitance values which exceed a second threshold, called the "mutual threshold".

Then, the processor 330 determines whether the bending mode has been entered or not according to the above counting results. Specifically, the processor 330 makes the touch-sensing display device 300 enter the bending mode when the first and second numbers N1 and N2 are over a first predetermined number P1 and a second predetermined number P2 respectively, and the third number N3 is below the first number N1.

The processor 330 carries out a second operation to raise the second threshold (the mutual threshold) when the touch-sensing display device 300 is in the bending mode.

In another exemplary embodiment of the present invention, the processor 330 further counts a fourth number N4 of third capacitance-variation values which are up to the maximum capacitor-variation value. Then, the processor 330 makes the touch-sensing display device 300 enter the bending mode when the fourth number N4 is over a third predetermined number P3.

Generally, there are two techniques, Palm Rejection and Recalibration, which are widely applied to the touch-sensing display device, as it is know in the art.

The function of Palm Rejection makes the touch-sensing display device ignore a large amount of variation of the capacitance value, resulting from the large area which is pressed. For example, when the user puts his palm on the surface of the touch-sensing display device and touches the touch-sensing display device with a finger at the same time, his palm covering the large area on the surface results in a large amount of variation in the capacitance value, and the touch-sensing display device cannot identify the point on the touch-sensing display device that is being touched by the user's finger, further resulting in the breaking down of the touch-sensing display device. Thus, a Palm Rejection is performed to make the touch-sensing display device ignore a large amount of variation in the capacitance value.

With respect to Recalibration, because the drastic changes in the variation of the capacitance value results in the touch-sensing display device breaking down as well, Recalibration is performed to recalibrate the drastic changes of the variation of the capacitance value so as to achieve the zeroing calibration of the variation of the capacitance value. Because Recalibration makes the variation of the capacitance value of the point change to "0" value, the touch-sensing display device does not make the response to that point.

However, the Bending Phenomenon also causes a large amount of variation in the capacitance value and drastic changes in the variation of the capacitance value. The touch-sensing display device 300 of the present invention is presented in order to perform touch functions normally when the Bending Phenomenon occurs. On the other hand, if Palm Rejection and Recalibration are performed, because a large variation in the capacitance value is ignored and the variation of the capacitance value changes to "0" value, the touch-sensing display device 300 cannot perform touch functions normally anymore.

Accordingly, in another exemplary embodiment of the present invention, if the touch-sensing display device 300 further has the functions of Palm Rejection and Recalibration, then when the processor 330 makes the touch-sensing display device 300 enter the bending mode, the processor 330 disables the functions of Palm Rejection and Recalibration so as to perform touch functions normally.

Figure 5:
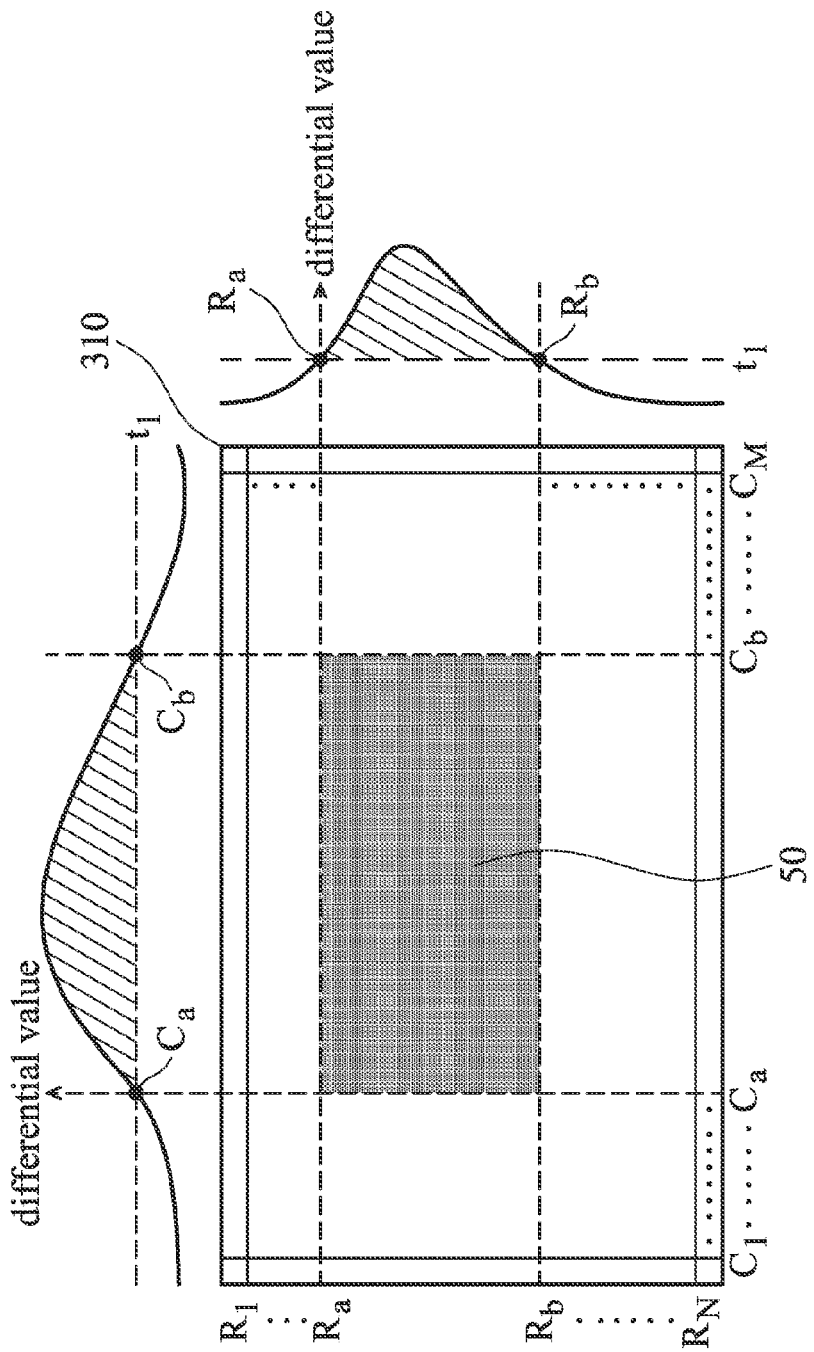
FIG. 5 is a diagram illustrating the bending zone and the non-bending zone of the touch-sensing display device 300 according to another exemplary embodiment of the present invention.

FIG. 5 is a diagram illustrating the bending zone and the non-bending zone of the touch-sensing display device 300 according to another exemplary embodiment of the present invention. In the present embodiment, the touch-sensing display device 300 further defines the bending zone and the non-bending zone according to the variation in the capacitance value of Self Capacitance and only raises the second threshold (the mutual threshold) in the bending zone. The way to define the bending zone and the non-bending zone are described below.

The processor 330 knows what row electrodes and column electrodes are over the first threshold (the self threshold), according to the detection results detected by the capacitance detector 320. For example, referring to FIG. 4 and FIG. 5, it is obvious that the differential values from the column electrode $C_a$ to the column electrode $C_b$ are over the first threshold $t_1$. Similarly, the differential values from the row electrode $R_a$ to the row electrode $R_b$ are over the first threshold $t_1$ as well. Thus, the processor 330 defines the region where the first capacitance-variation values exceed the first threshold (indicated the row electrode $R_a$ to the row electrode $R_b$, as shown in FIG. 5) and the second capacitance-variation values exceed the first threshold (indicated the column electrode $C_a$ to the column electrode $C_b$, as shown in FIG. 5) as a bending zone 50 and defines the rest of the region as a non-bending zone. The processor 330 raises the second threshold (the mutual threshold) of the bending zone 50. On the other hand, the bending zone 50 adopts the higher threshold and the non-bending zone adopts the lower threshold conversely.

Figure 6:
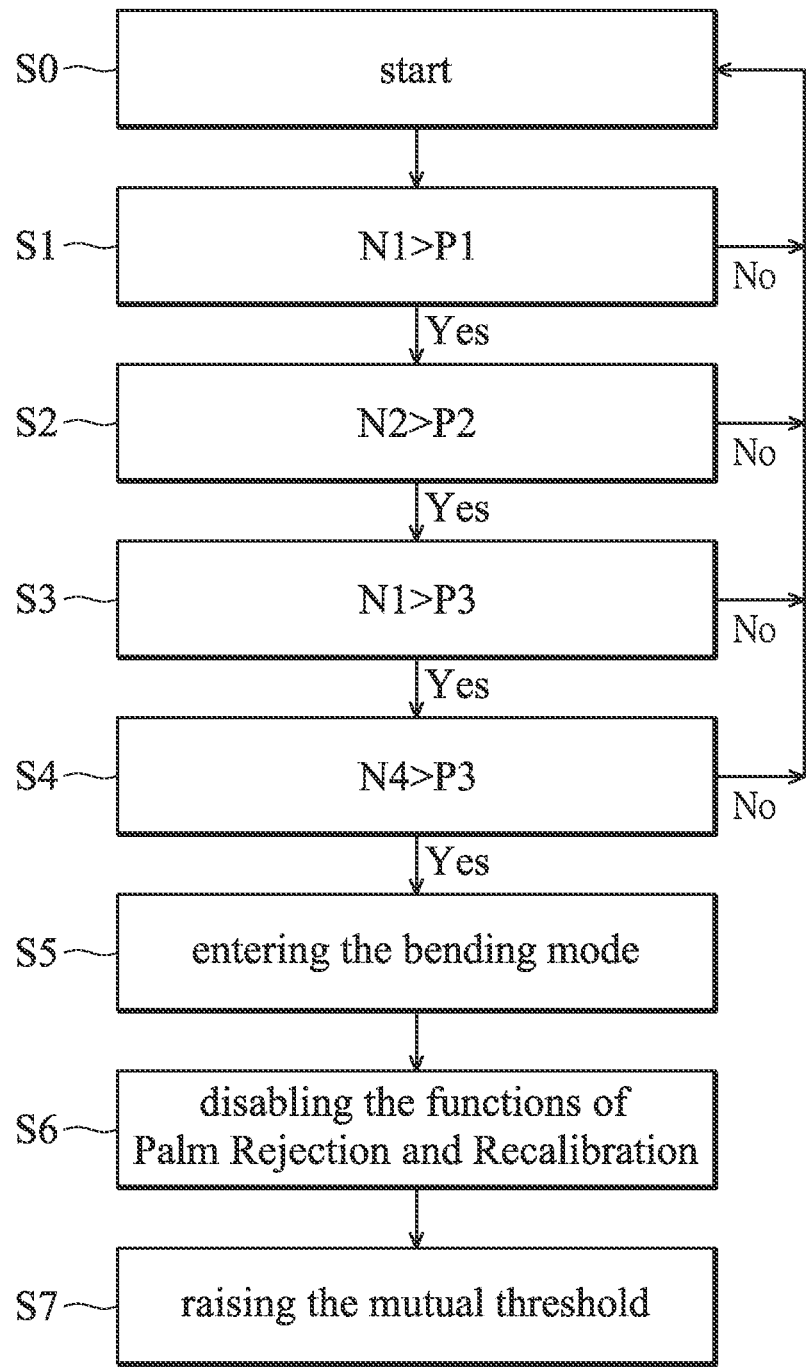
FIG. 6 is a flow chart illustrating entering the bending mode and raising the mutual threshold according to the exemplary embodiment of the present invention.

In the above exemplary embodiment of present invention, the variation of capacitance value of Self Capacitance is more sensitive and larger than the variation of the capacitance value of Mutual Capacitance when the Bending Phenomenon occurs, so the variation of capacitance value of Self Capacitance serves as the main principle to determine whether entering bending mode or not. However, the above descriptions are only for exemplifying the invention and it is not limited thereto FIG. 6 is a flow chart illustrating how to enter the bending mode and raise the mutual threshold according to the exemplary embodiment of the present invention. In step S1, the processor 330 determines whether the first number N1 is over a first predetermined number P1 or not; if "yes", then the process proceeds to step S2, otherwise it returns to step S0. In step S2, the processor 330 determines whether the second number N2 is over a second predetermined number P2 or not; if "yes", then the process proceeds to step S3, otherwise it returns to step S0. In step S3, the processor 330 determines whether the third number N3 is below the first number N1 or not; if "yes", then the process proceeds to step s4, otherwise it returns to step S0. In step S4, the processor 330 further determines whether the fourth number N4 is over a third predetermined number P3 or not; if "yes", the processor 330 makes the touch-sensing display device 300 enter the bending mode, step S5. After the processor 330 makes the touch-sensing display device 300 enter the bending mode, the processor 330 disables the functions of Palm Rejection and Recalibration. Then, in step S7, the processor 330 raises the mutual threshold, as shown in FIG. 3. It should be noted that the order of steps S1-S4 can be arranged at random, and this reordering would not affect the expected function of the present invention. Similarly, the order of steps S6-S7 can be arranged at random as well.

Based on the above descriptions, it is realized the present invention provides a touch-sensing display device 300, having a function of raising the mutual threshold so as to prevent the touch-sensing display device from misreporting the touch point when the Bending Phenomenon occurs.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch-sensing display device, comprising:
    a plurality of row electrodes and column electrodes;
    a capacitance detector, detecting first capacitance-variation values of each of the row electrodes with respect to a reference and second capacitance-variation values of each of the column electrodes with respect to the reference, and detecting third capacitance-variation values of each intersection of the row electrodes and the column electrodes; and
    a processor, carrying out a first operation to determine the entering of a bending mode, according to the first, second and third capacitance-variation values; in the first operation, the processor counting the first number of the first and second capacitance-variation values which exceed a first threshold, counting the second number of the first and second capacitance-variation values which are up to a maximum capacitor-variation value, and counting the third number of the third capacitance values which exceed a second threshold; the processor making the touch-sensing display device enter the bending mode when the first and second numbers are over a first predetermined number and a second predetermined number respectively, and the third number is below the first number;
    the processor carrying out a second operation to raise the second threshold when the touch-sensing display device is in the bending mode.

2. The touch-sensing display device as claimed in claim 1, wherein
    in the first operation, the processor further counting a fourth number of third capacitance-variation values which are up to the maximum capacitor-variation value; the processor making the touch-sensing display device enter the bending mode when the first and second numbers are over a first predetermined number and a second predetermined number respectively, the third number is below the first number, and the fourth number is over a third predetermined number.

3. The touch-sensing display device as claimed in claim 1, wherein the touch-sensing display device further has the functions of Palm Rejection and Recalibration;
    when the processor is making the touch-sensing display device enter the bending mode, the processor disables the functions of Palm Rejection and Recalibration.

4. The touch-sensing display device as claimed in claim 1, wherein the capacitor detector further comprises:
    a self-sensing channel, detecting the first capacitance-variation values and the second capacitance-variation values and transmitting the detection results to the processor; and
    a mutual sensing channel, detecting the third capacitance-variation values and transmitting the detection results to the processor.

5. The touch-sensing display device as claimed in claim 1, wherein the processor defines the region where the first capacitance-variation values of the row electrodes exceed the first threshold and the second capacitance-variation values of the column electrodes exceed the first threshold as a bending zone and defines the rest of the region as a non-bending zone and the processor raises the second threshold of the bending zone.

6. A method for reducing the misreporting of the touch point of a touch-sensing display device, comprising:
    providing a plurality of row electrodes and column electrodes;
    detecting first capacitance-variation values of each of the row electrodes with respect to a reference and second capacitance-variation values of each of the column electrodes with respect to the reference, and detecting third capacitance-variation values of each intersection of the row electrodes and the column electrodes;
    counting the first number of the first and second capacitance-variation values which exceed a first threshold, counting the second number of the first and second capacitance-variation values which are up to a maximum capacitor-variation value, and counting the third number of the third capacitance values which exceed a second threshold, in the first operation;
    carrying out a first operation to determine the entering of a bending mode, according to the first, second and third capacitance-variation values;
    making the touch-sensing display device enter the bending mode when the first and second numbers are over a first predetermined number and a second predetermined number respectively, and the third number is below the first number; and
    carrying out a second operation to raise the second threshold when the touch-sensing display device is in the bending mode.

7. The method for reducing the misreporting of the touch point of the touch-sensing display device as claimed in claim 6, further comprising:
    counting a fourth number of third capacitance-variation values which are up to the maximum capacitor-variation value;
    making the touch-sensing display device enter the bending mode when the fourth number is over a third predetermined number.

8. The method for reducing the misreporting of the touch point of the touch-sensing display device as claimed in claim 6, wherein the touch-sensing display device further has the functions of Palm Rejection and Recalibration;
    disabling the functions of Palm Rejection and Recalibration when making the touch-sensing display device enter the bending mode.

9. The method for reducing the misreporting of the touch point of the touch-sensing display device as claimed in claim 6, further comprising:
    defining the region where the first capacitance-variation values of the row electrodes exceed the first threshold and the second capacitance-variation values of the column electrodes exceed the first threshold as a bending zone, defining the rest of the region as a non-bending zone, and the processor raising the second threshold of the bending zone.

* * * * *